(12) United States Patent
Kaneko (10) Patent No.: US 7,467,643 B2
(45) Date of Patent: Dec. 23, 2008

(54) FITTING FOR FUEL TANKS

(75) Inventor: Kenichiro Kaneko, Aichi-ken (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 531 days.

(21) Appl. No.: 10/948,249

(22) Filed: Sep. 24, 2004

(65) Prior Publication Data

US 2005/0067027 A1 Mar. 31, 2005

(30) Foreign Application Priority Data

Sep. 25, 2003 (JP) .............................. 2003-333859

(51) Int. Cl.
*F17D 1/00* (2006.01)
*F16K 17/14* (2006.01)
*F16L 35/00* (2006.01)

(52) U.S. Cl. ............................ 137/592; 137/797; 285/4

(58) Field of Classification Search ................ 137/797, 137/592; 285/3, 4; 141/350
See application file for complete search history.

(56) References Cited

U.S. PATENT DOCUMENTS

| | | | | | |
|---|---|---|---|---|---|
| 2,048,388 | A | * | 7/1936 | Johnsen | 137/68.12 |
| 3,630,214 | A | * | 12/1971 | Levering | 137/68.15 |
| 3,794,057 | A | * | 2/1974 | Badger | 137/68.15 |
| 4,064,889 | A | * | 12/1977 | Gayle et al. | 137/68.14 |
| 4,077,422 | A | * | 3/1978 | Brinkley et al. | 137/68.14 |
| 4,131,142 | A | * | 12/1978 | Barr et al. | 141/302 |
| 4,762,140 | A | * | 8/1988 | Davis | 137/71 |
| 4,886,087 | A | * | 12/1989 | Kitchen | 137/68.14 |
| 5,289,842 | A | * | 3/1994 | Bravo | 137/68.11 |
| 5,357,998 | A | * | 10/1994 | Abrams | 137/68.11 |
| 5,454,394 | A | * | 10/1995 | Moore et al. | 137/71 |
| 5,758,682 | A | * | 6/1998 | Cain | 137/68.14 |
| 5,941,268 | A | * | 8/1999 | Ross, Jr. | 137/68.14 |
| 6,056,029 | A | * | 5/2000 | Devall et al. | 141/383 |

(Continued)

FOREIGN PATENT DOCUMENTS

JP U-51-21723 2/1976

(Continued)

OTHER PUBLICATIONS

Notification for Refusal dated Jan. 8, 2008 in corresponding Japanese Patent Application No. 2003-333859.

*Primary Examiner*—Ramesh Krishnamurthy
*Assistant Examiner*—Andrew J Rost
(74) *Attorney, Agent, or Firm*—Posz Law Group, PLC (57) ABSTRACT

A fuel-tank fitting includes a cylinder-shaped fitting body including a connecting end to be connected with a pipe and a free end to be disposed freely inside a fuel tank, a flange disposed on an outer peripheral surface of the fitting body, and fastened to an opening periphery of an installation opening opened through the fuel tank, and a check valve disposed in the fitting body, openable only in a direction heading from the connecting end of the fitting body to the free end thereof, and closable for sealing a fuel. The fitting body further includes a first portion sealing the check valve, a second portion fastened to a portion of the flange, a third portion connecting the first and second portions, and a fragile portion fracturing more preferentially than the first and second portions and the flange fracture while securing a fuel-sealing ability inside the fuel tank.

4 Claims, 13 Drawing Sheets

U.S. PATENT DOCUMENTS

| | | | |
|---|---|---|---|
| 6,178,982 B1 * | 1/2001 | Longstreth | 137/68.14 |
| 6,192,948 B1 * | 2/2001 | Claessens et al. | 141/383 |
| 6,378,549 B1 * | 4/2002 | Zapp | 137/315.01 |
| 2002/0121517 A1 * | 9/2002 | Aoki et al. | 220/4.14 |

FOREIGN PATENT DOCUMENTS

| | | |
|---|---|---|
| JP | A-09-076771 | 3/1997 |
| JP | A-11-115509 | 4/1999 |
| JP | A-2002-054519 | 2/2002 |
| JP | A-2002-087079 | 3/2002 |

* cited by examiner

FITTING FOR FUEL TANKS

BACKGROUND OF THE INVENTION

1. Field of the Invention

The present invention relates to a fitting for fuel tanks which is intervened between a fuel tank and a pipe.

2. Description of the Related Art

Figure 13:
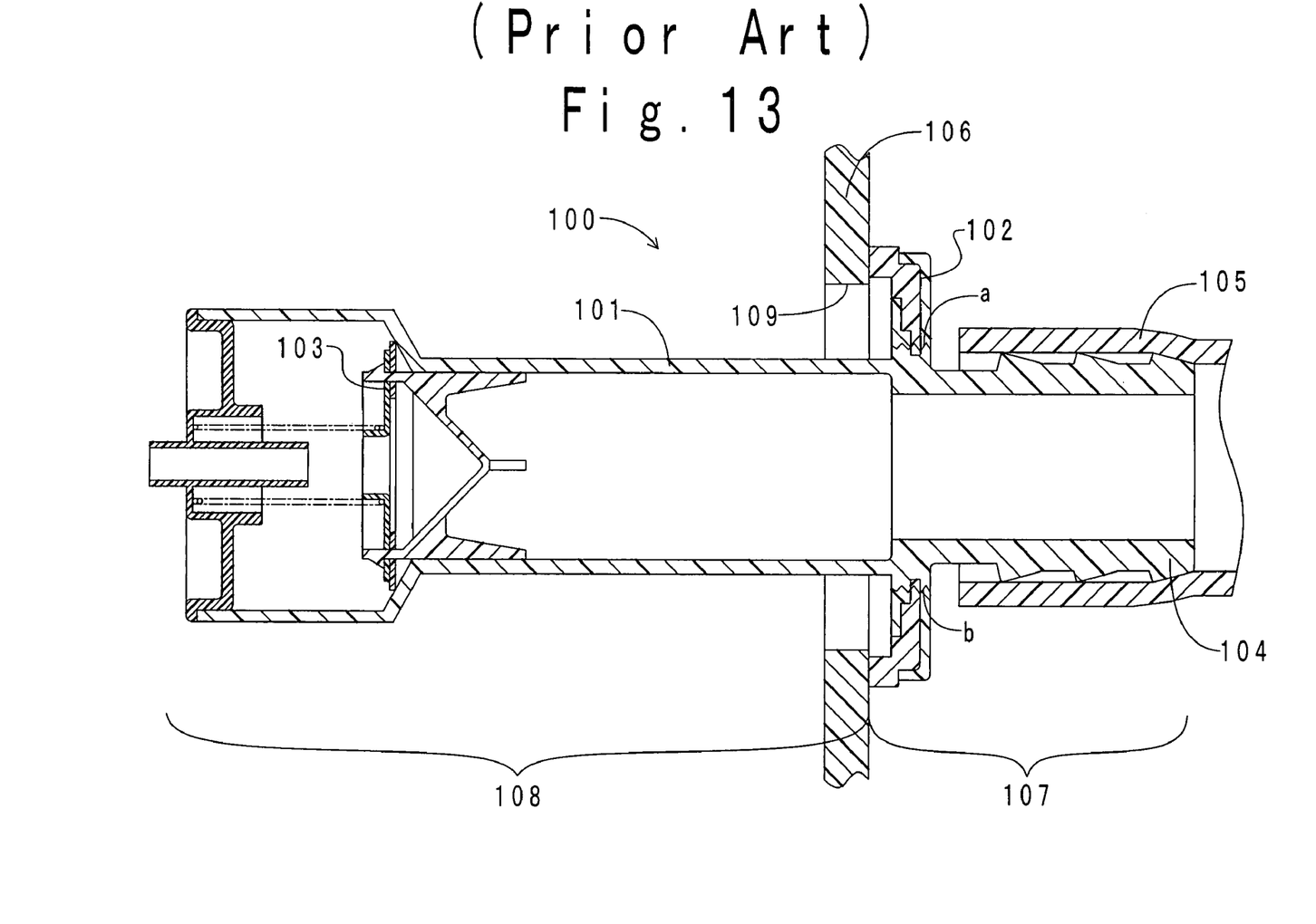
FIG. 13 is an axial cross-sectional view of the conventional fuel-tank fitting.

Conventionally, rubber hoses have been intervened between a resinous filler pipe, which is communicated with a filler opening, and a fuel-tank fitting, which is installed to a fuel tank. Recently, a fuel-tank fitting has been developed which is connected directly with a filler pipe, for example, one which is disclosed in Japanese Unexamined Patent Publication (KOKAI) NO. 2002-54,519. FIG. 13 illustrates an axial cross-sectional view of the fuel-tank fitting set forth in the publication. As shown in the drawing, a fuel-tank fitting 100 comprises a fitting body 101, a flange 102, and a check valve 103. The fitting body 101 comprises a projection 107, and an accommodation 108. The projection 107 protrudes to the outside of a fuel tank 106. A connecting end 104 is disposed at the leading end of the projection 107. The connecting end 104 is fitted into a filler pipe 105 by press-in fitting. The flange 102 is formed to have a diameter enlarging from small to large in a direction away from the root of the projection 107. The flange 102 is welded to the opening periphery of an installation opening 109. The check valve 103 is disposed in the accommodation 108. The check valve 103 opens only in a direction heading from the outside of the fuel tank 106 to the inside.

In the fuel-tank fitting 100, it is necessary to secure a fuel-sealing ability between the projection 107 and the filler pipe 105. However, the resinous filler pipe 105 exhibits a lower configuration-following ability than that of rubber hoses. Therefore, it is needed to provide the projection 107 fitted into the filler pipe 105 with a larger press-in allowance in order to secure a reliable fuel-sealing ability. That is, it is required to lengthen the projection 107.

When the projection 107 is made longer, stresses might concentrate at the root of the projection 107 if certain shocks are applied to the projection 107 or the filler pipe 105. Accordingly, there arises a fear that cracks "a" and "b" occur, for example. When the cracks "a" and "b" occur, the inside and outside of the fuel tank 106 are communicated with each other. Consequently, a fuel has leaked out of the fuel tank 106. Thus, it is feared that the fuel-tank fitting 100 might not secure a satisfactory fuel-sealing ability for the fuel tank 106 upon being subjected to shocks.

On the other hand, the thickness of the fuel-tank fitting 100 can be enlarged to upgrade the shock resistance in order that the fuel-tank fitting 100 secures an adequate fuel-sealing ability for the fuel tank 106. However, when the fuel-tank fitting 100 is thickened, it is difficult to carry out the molding. That is, the molding cycle has been prolonged, for instance. Moreover, there is a fear that molding shrinkage might result in the occurrence of sink marks.

SUMMARY OF THE INVENTION

The present invention has been developed and completed in view of such circumstances. It is therefore an object of the present invention to provide a fitting for fuel tanks which can secure a predetermined fuel-sealing ability for fuel tanks upon being subjected to shocks.

A fitting for fuel tanks according to the present invention can solve the aforementioned problems, and comprises:

a cylinder-shaped fitting body comprising a connecting end to be connected with a pipe, and a free end to be disposed freely inside a fuel tank;

a flange disposed on an outer peripheral surface of the fitting body, and fastened to an opening periphery of an installation opening opened through the fuel tank; and a check valve disposed in the fitting body, being openable only in a direction heading from the connecting end of the fitting body to the free end thereof, and being closable for sealing a fuel;

the fitting body further comprising a first portion sealing the check valve, a second portion fastened to a portion of the flange, a third portion connecting the first portion and the second portion, and a fragile portion fracturing more preferentially than the first portion, the second portion, the third portion and the flange fracture while securing a fuel-sealing ability among the fitting body, the flange and the check valve.

Specifically, the present fuel-tank fitting comprises the fragile portion. Upon being subjected to shocks, the fragile portion fractures more preferentially than any other portions of the present fuel-tank fitting. Accordingly, the energy of shocks is consumed intensively to fracture the fragile portion. Consequently, it is possible to inhibit portions other than the fragile portion from fracturing. Moreover, even if the fragile portion should have fractured completely, the part of the present fuel-tank fitting from the first portion, which seals the check valve, the second portion, which is fastened to a portion of the flange, the third portion, which connects the first portion and the second portion, to the flange, is left as being installed to the fuel tank. That is, the fuel-sealing ability is kept secured among the fitting body, the flange and the check valve, that is, between the first portion and the check valve, between the second portion and the flange, between the third portion and the first and second portions inside the fuel tank. Therefore, the present fuel-tank fitting can keep sustaining the fuel-sealing ability between itself and the fuel tank even after the fragile portion fractures.

Moreover, in accordance with the present invention, it is not necessary to daringly thicken the present fuel-tank fitting. Therefore, the present fuel-tank fitting can be molded with ease. To be more precise, the present fuel-tank fitting can be molded in a shortened molding cycle. In addition, failure molding such as sink marks is less likely to occur when molding the fitting body of the present fuel-tank fitting.

It is preferable to arrange the present fuel-tank fitting so that the fitting body can further comprise a projection protruding to the outside of the fuel tank and being provided with the connecting end, an accommodation accommodated inside the fuel tank and provided with the free end, and the fragile portion disposed at a root of the projection; the flange can have a diameter enlarging from small to large in a direction away from the root of the projection of the fitting body; and the check valve can be disposed in the accommodation of the fitting body.

Stresses are likely to concentrate on the root of the projection of the fitting body when the present fuel-tank fitting is subjected to shocks. In the present fuel-tank fitting arranged as described above, the fragile portion is disposed at a root of the projection. With such a preferable arrangement, stresses are likely to concentrate on the fragile portion. As a result, it is possible to securely fracture the fragile portion only upon being subjected to shocks.

It is more preferable to further modify the present fuel-tank provided with the preferable arrangement so that the projection of the fitting body can comprise a high-rigidity inner periphery welded to the accommodation, and an outer periphery disposed outside the high-rigidity inner periphery and being of lower rigidity than that of the high-rigidity inner periphery; the portion of the flange fastened to the opening periphery of the installation opening can have a diameter enlarging from small to large in a direction away from the outer periphery of the projection; the fragile portion can comprise a thinned portion formed partially in the high-rigidity inner periphery of the projection.

With such a more preferable arrangement, the fragile portion is formed by partially thinning the high-rigidity inner periphery of the projection. Accordingly, it is more likely to amplify the rigidity difference between the fragile portion and the other portions, compared with the case where the fragile portion is formed by partially thinning the low-rigidity outer periphery of the projection. Consequently, the more preferable arrangement can make stresses more likely to concentrate at the fragile portion.

Thus, the present fuel-tank fitting can secure a predetermined fuel-sealing ability for fuel tanks more reliably upon being subjected to shocks.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Having generally described the present invention, a further understanding can be obtained by reference to the specific preferred embodiments which are provided herein for the purpose of illustration only and not intended to limit the scope of the appended claims. Hereinafter, the present invention will be described with reference to forms of embodying the present fuel-tank fitting.

EXAMPLES

Example No. 1

Figure 1:
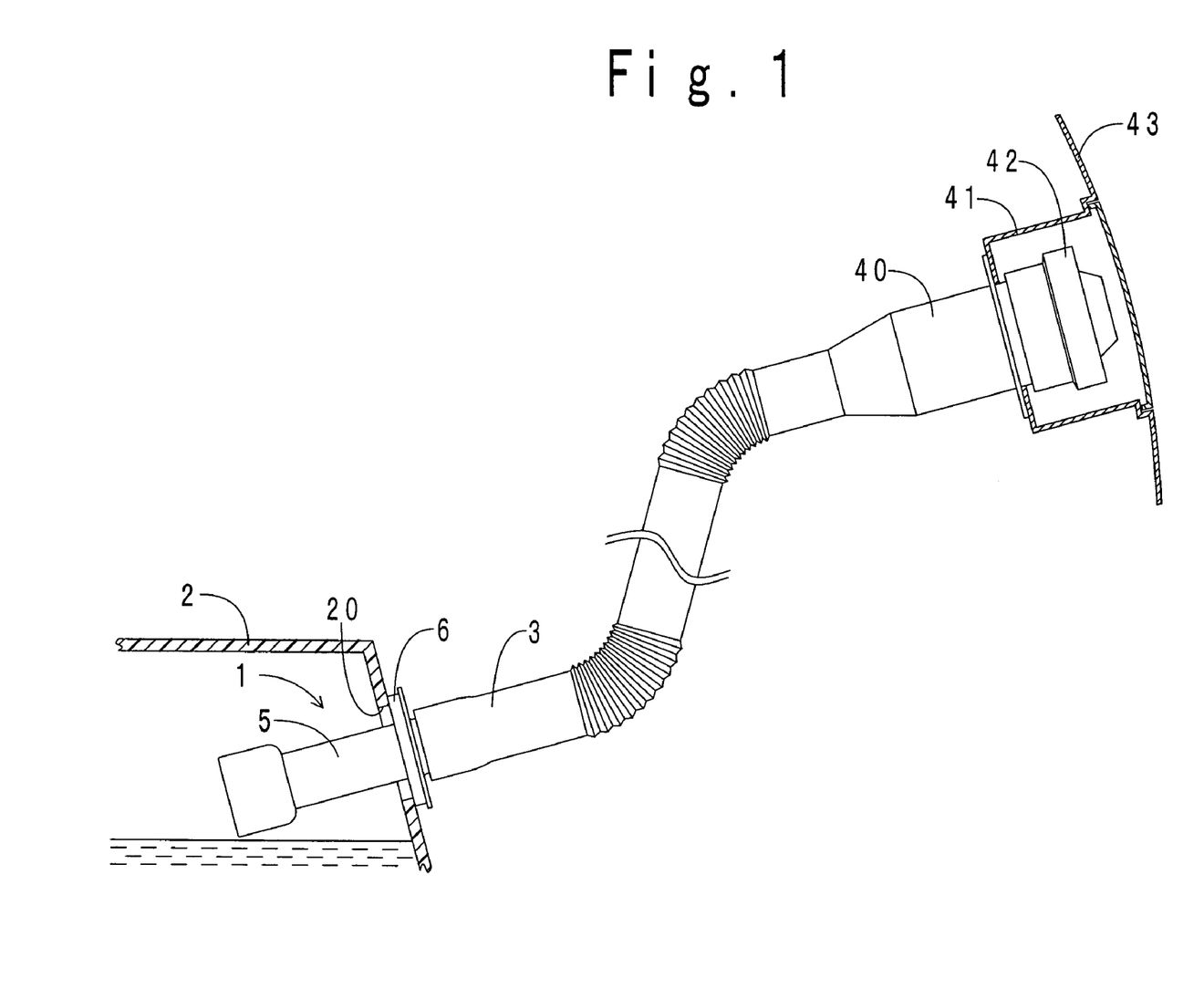
FIG. 1 is a schematic diagram for illustrating how to install a fuel-tank fitting according to Example No. 1 of the present invention to a fuel tank.

First, the arrangement of a fuel-tank fitting according to Example No. 1 of the present invention will be hereinafter described in detail. FIG. 1 illustrates an installation diagram for depicting how the fuel-tank fitting according to Example No. 1 is installed to a fuel tank. As shown in the drawing, a fuel-tank fitting 1 is disposed to cover an installation opening 20 opened through a fuel tank 2. A filler pipe 3 is connected with the upstream end of the fuel-tank fitting 1. Note that the present pipe includes the filler pipe 3. An inlet pipe 40 is connected with the upstream end of the filler pipe 3. The upstream-side portion of the inlet pipe 40 protrudes into an inlet box 41 recessed in a vehicle panel 43. A filler opening (not shown) is opened at the upstream end of the inlet pipe 40. A filler cap 42 is screwed into the filler opening. A fuel is supplied to the fuel tank 2 through the filler opening by way of the inlet pipe 40, the filler pipe 3 and the fuel-tank fitting 1. A later-described check valve is disposed within the fuel-tank fitting 1. Accordingly, there is no fear that the fuel flows back from the fuel tank 2 to the filler opening.

Figure 2:
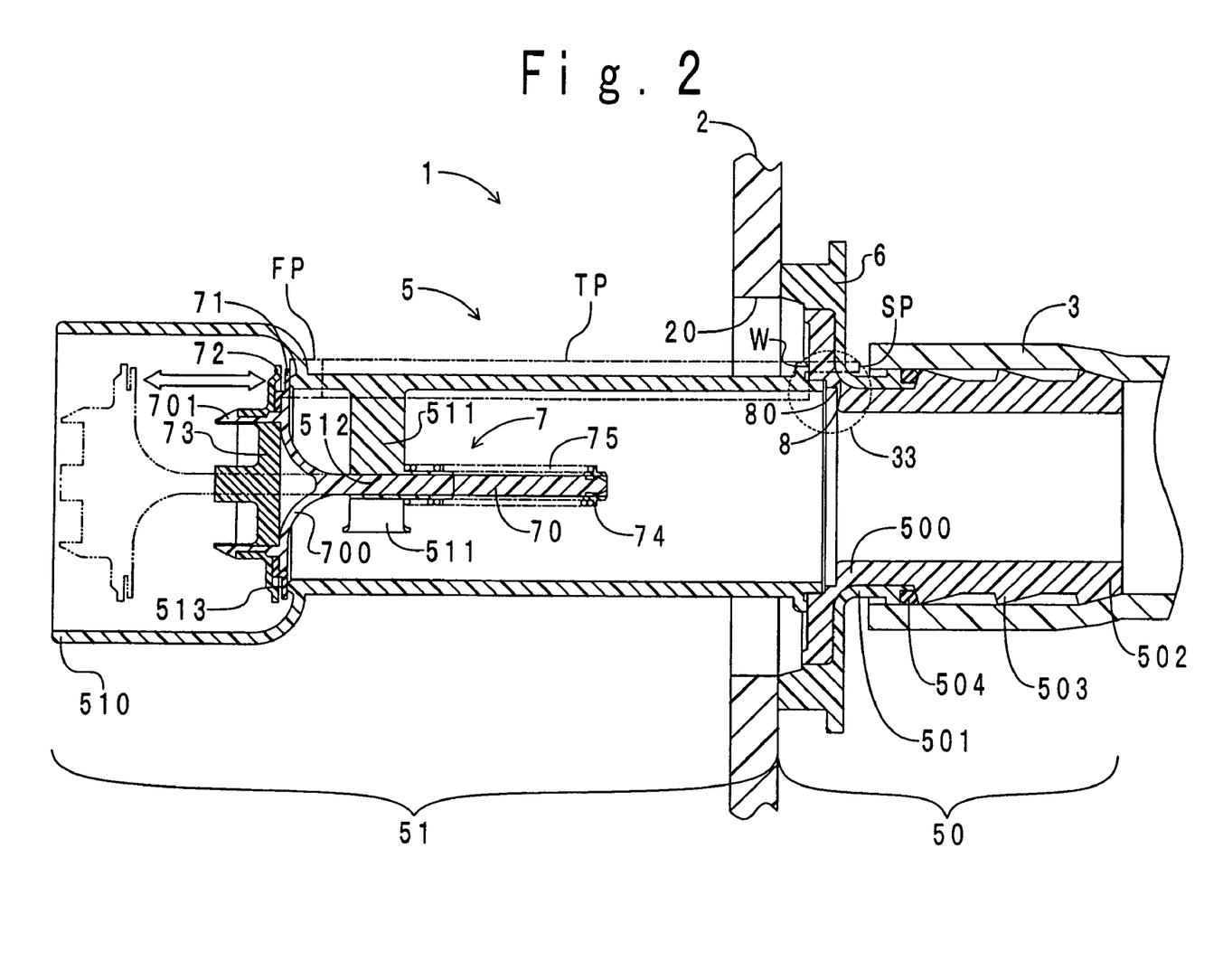
FIG. 2 is an axial cross-sectional view of the fuel-tank fitting according to Example No. 1.

FIG. 2 illustrates an axial cross-sectional view of the fuel-tank fitting 1 according to Example No. 1. As shown in the drawing, the fuel-tank fitting 1 comprises a fitting body 5, a flange 6, a check Valve 7, and a fragile portion 8. The fining body 5 comprises a projection 50, and an accommodation 51. The projection 50 comprises an inner periphery (or inner layer) 500, and an outer periphery (or outer layer) 501.

The inner periphery 500 is made of polyamide (hereinafter abbreviated to as "PA"), and is formed as a cylinder shape. A connecting end 502 is disposed at the protruding end of the inner periphery 500. Annular ribs 503 whose cross section has a triangle shape are formed on the outer peripheral surface of the inner periphery 500. The annular ribs 503 are disposed in a quantity of three in total in a manner neighboring in the axial direction of the inner periphery 500. The inner periphery 500 is fitted into a filler pipe 3 made of resin. The annular ribs 503 press against the inner periphery of the filler pipe 3.

The outer periphery 501 is made of maleic acid-modified polyethylene (hereinafter abbreviated to as "adhesive PE"), and is formed as a cylinder shape. The outer periphery 501 is molded firstly and the inner periphery 500 is molded secondary, thereby bonding the adhesive PE with the PA chemically. An O ring 504 made of rubber is disposed around the outer peripheral surface of the protruding end of the outer periphery 501. The O ring 504 contacts elastically with the inner peripheral surface of the filler pipe 3. Note that the rigidity of the outer periphery 501 is designed to be lower than that of the inner periphery 500.

The accommodation 51 is made of PA containing glass fibers, and is formed as a cylinder shape. One of the opposite ends of the accommodation 51 to be connected with the projection 50 is welded to the inner periphery 500. That is, a weld "W" connects the bearing end for connecting the projection 50 of the accommodation 51 with the inner periphery 500. In other words, the weld "W" connects the second portion "SP" with the third portion "TP." At the other one of the opposite ends of the accommodation 51, there is disposed a free end 510 of the fitting body 5. Valve supporting tabs 511 protrude from the inner peripheral surface of the accommodation 51 inward in the radial direction. The valve supporting tabs 511 are disposed at intervals of 120° in a quantity of three in total. The three valve supporting tabs 511 are joined with each other at the center in the diametric direction of the accommodation 51. A valve holding hole 512 is bored through the valve supporting tabs 511 at the diametric center. A ring-shaped valve seat 513 is disposed on an opposite end of the accommodation 51 adjacent to the free end 510 of the fitting body 5.

The check valve 7 comprises a valve element 70, a seal ring 71, a back-up ring 72, a retainer 73, a spring receiver 74, and a metallic spring 75. The valve element 70 is made of polyoxymethylene (hereinafter abbreviated to as "POM"), and is formed as a bugle shape having a diametrically-enlarging end 700 at one of the opposite ends adjacent to the free end 510 of the fitting body 5. The valve element 70 is fitted into the valve supporting hole 512 of the valve supporting tabs 511. The spring receiver 74 is made of POM, and is formed as a cylinder shape. The spring receiver 74 is disposed around and fastened to one of the opposite ends of the valve element 70 adjacent to the connecting end 502 of the fitting body 5. The spring 75 intervenes between the spring retainer 74 and the valve supporting tabs 511. Engaging claws 701 protrude from the diametrically enlarging end 700 of the valve element 70. The engaging claws 701 are disposed at intervals of 90° in a quantity of four in total. The seal ring 71 is made of rubber, and is formed as an annular shape. The seal ring 71 is disposed around the outer peripheral surface of the engaging claws 701 protruding from the diametrically enlarging portion 700 of the valve element 70. The seal ring 71 is detachable to and from the valve seat 513. The back-up ring 72 is made of POM, and is formed as an annular shape. The back-up ring 72 neighbors the sealing ring 71 on one of the opposite sides of the seal ring 71 adjacent to the free end 510 of the fitting body 5. The back-up ring 72 engages with the engaging claws 701. The engagement positions the back-up ring 72 in place. The retainer 73 is made of POM, and is formed as an annular shape provided with a cross-shaped reinforcement rib. The retainer 73 is fitted by press-in fitting into the inner periphery of the engaging claws 700 protruding from the diametrically enlarging portion 700 of the valve element 70. The retainer 73 inhibits the engaging claws 701 from warping radially inward. The check valve 7 is urged by the spring 75 in such a direction that the seal ring 71 seats on the valve seat 513. As illustrated with the chain double-dashed line of FIG. 2, the pressure of fuel opens the check valve 7 only in the direction heading from the connecting end 502 of the fitting body 5 to the free end 510.

The flange 6 is formed by diametrically enlarging the root of the outer periphery 501 of the projection 50. The flange 6 is welded to the opening periphery of the installation opening 20 opened through the fuel tank 2 made of polyethylene (hereinafter abbreviated to as "PE").

The first portion "FP" comprises the ring-shaped portion 513, as designated with the chain-lined frame of FIG. 2. The second portion "SP" extends continuously from the bottom of the flange 6, as designated with the chain-lined frame of FIG. 2. The third portion "TP" is disposed between the first portion "FP" and the second portion "SP," as designated with the chain-lined frame of FIG. 2.

Figure 3:
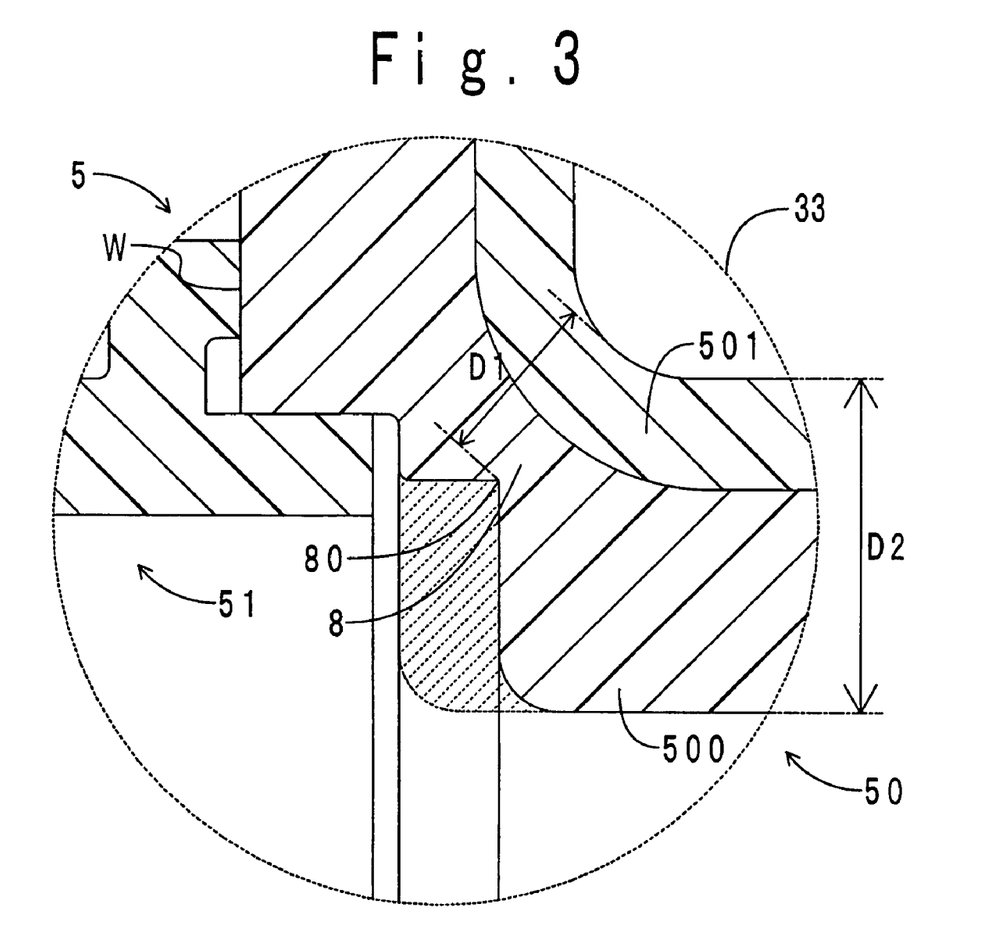
FIG. 3 is an enlarged diagram of a portion of the fuel-tank fitting according to Example No. 1 within the window 33 of FIG. 2, which is designated with a dotted line.

FIG. 3 illustrates an enlarged diagram of a portion of the fuel-tank fitting 1 according to Example No. 1 within the window 33 of FIG. 2, which is designated with a dotted line. As shown in the drawing, the fragile portion 8 is formed by thinning the root of the inner periphery 500 stepwise annularly. Note that the hatched area depicted with the dotted lines designates the thinned portion. The fragile portion 8 is molded simultaneously with the molding of the projection 50. The thickness "D1" of a part at which the fragile portion 8 is disposed is thinner than the thickness of the other parts, for instance, the thickness "D2."

Figure 4:
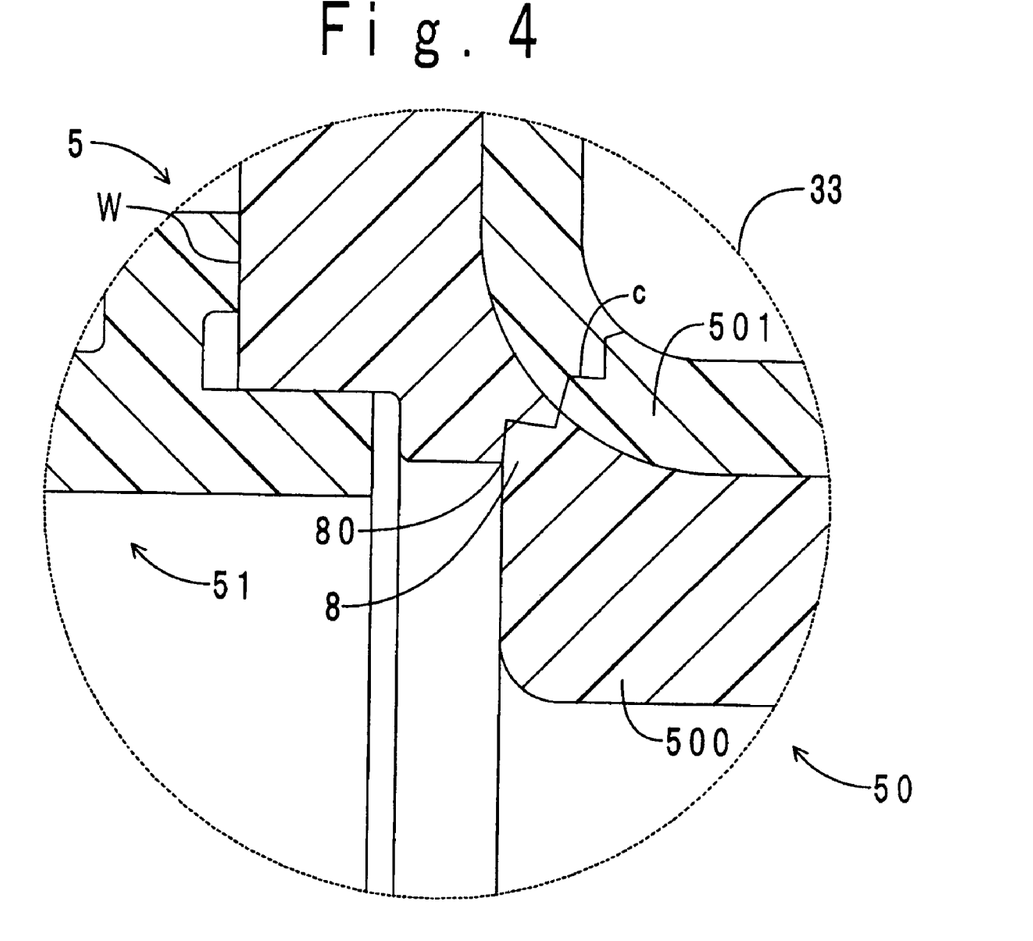
FIG. 4 is an enlarged diagram around a fragile portion of the fuel-tank fitting according to Example No. 1 upon being subjected to shocks.
Figure 5:
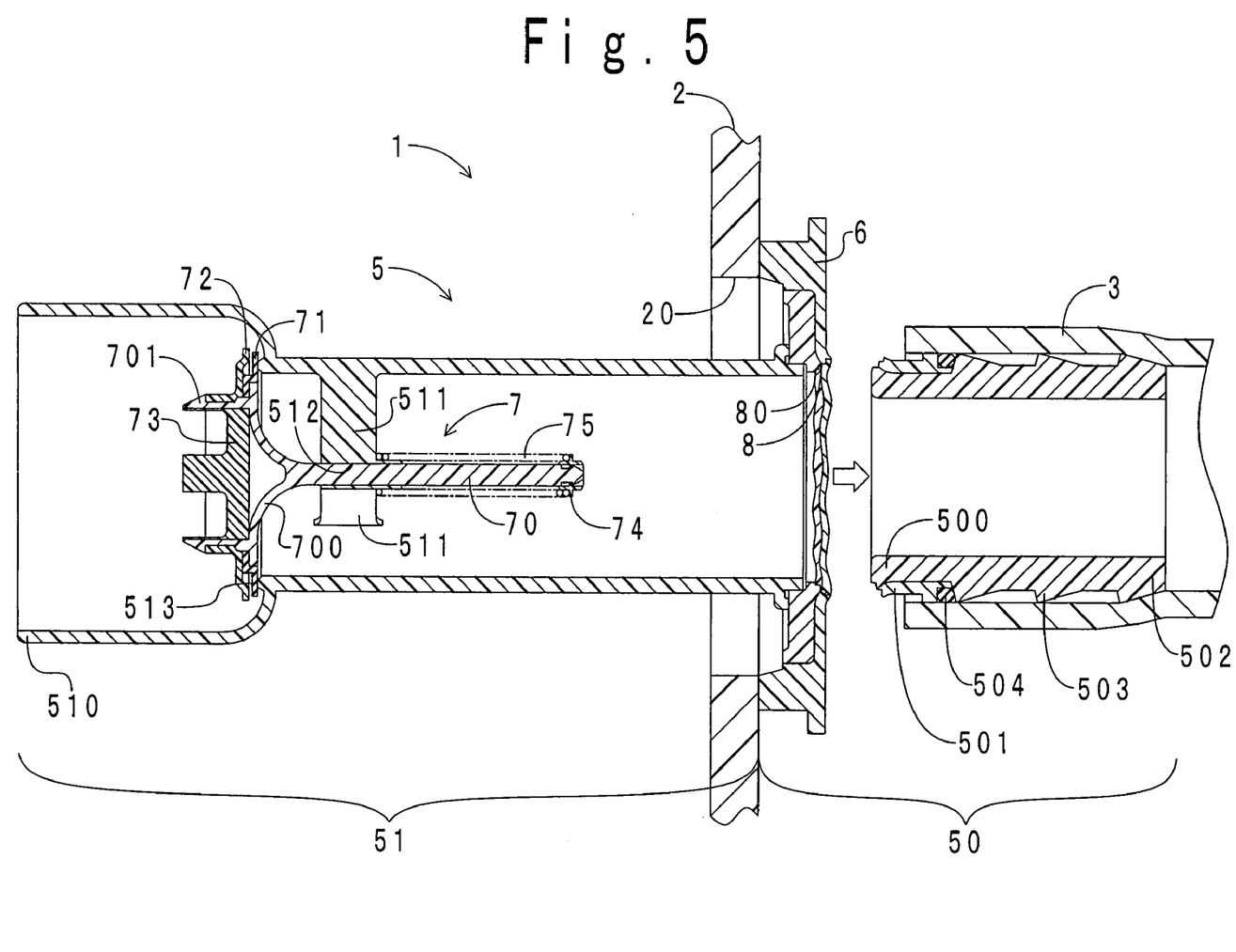
FIG. 5 is an axial cross-sectional view of the fuel-tank fitting according to Example No. 1 after being broken.

Next, how the fuel-tank fitting 1 according to Example No. 1 operates upon being subjected to shocks will be hereinafter described. When a shock is applied to the filler-pipe 3, stresses concentrate on a corner 80 of the fragile portion 8. Accordingly, a crack "c" develops in the fragile portion 8 starting at the corner 80 as illustrated in FIG. 4. The crack "c" penetrates the root of the projection 50. Consequently, the projection 50 separates from the root, and breaks into parts on which the fragile portion 8 borders, as illustrated in FIG. 5.

Finally, the advantages effected by the fuel-tank fitting 1 according to Example No. 1 will be hereinafter described. In the fuel-tank fitting 1, the thickness "D1" at the fragile portion 8 is designed to be thinner than that at the other parts, for instance, the thickness "D2." Upon being subjected to shocks, the fragile portion 8 fractures more preferentially than the other parts of the projection 50, the accommodation 51, the check valve 7 and the flange 6 do. Accordingly, the fracture of the fragile portion 8 consumes the energy of shocks intensively. Consequently, the parts other than the fragile portion 8 do not fracture.

When the fragile portion 8 fractures, that is when the projection 50 separates from the root, the flange 6 is kept to be welded to the opening periphery of the installation opening 20. Moreover, a part of the projection 50 left on the fuel tank 2 is kept to be welded to the accommodation 51. Furthermore, the check valve 7 is kept closing. Therefore, even after the projection 50 separates from the root, the fuel tank 2 sustains the fuel-sealing ability securely. In addition, it is not needed to daringly thicken the fuel-tank fitting 1 according to Example No. 1. Hence, the fuel-tank fitting 1 can be molded with ease.

Note that the fragile portion 8 is disposed at the root of the projection 50. Stresses, which result from the shocks coming laterally from the filler pipe 3 and projection 50, are likely to concentrate at the root-of the projection 50. Accordingly, in the fuel-tank fitting 1 according to Example No. 1, the stresses are more likely to concentrate at the fragile portion 8. Consequently, it is possible to securely fracture the fragile portion 8 upon being subjected to the shocks.

In the fuel-tank fitting 1 according to Example No. 1, the fragile portion 8 is formed by partially thinning the high-rigidity inner periphery 500 of the projection 50. Therefore, compared with the case where the fragile portion 8 is formed by partially thinning the low-rigidity outer periphery 501 of the projection 50, it is likely to enlarge the rigidity difference between the fragile portion 8 and the other parts of the projection 50. Hence, in view of such an arrangement, stresses are more likely to concentrate at the fragile portion 8.

In the fuel-tank fitting 1 according to Example No. 1, the corner 80 is formed in the thinned portion (i.e., the hatched area of FIG. 3 designated with the dotted lines). The corner 80 also makes stresses more likely to concentrate at the fragile portion 8.

In the fuel-tank fitting 1 according to Example No. 1, the flange 6 is firmly welded to the opening periphery of the installation opening 20. Moreover, the projection 50 is firmly welded to the accommodation 51. Accordingly, there is no fear of disintegrating the thus joined component parts prior to the fracture of the fragile portion 8. In addition, there hardly arises fear that the excessive shock energy after being consumed to fracture the fragile portion 8 disintegrates the joined component parts. Consequently, the fuel tank 2 exhibits a high fuel-sealing ability.

In the fuel-tank fitting 1 according to Example No. 1, the inner periphery 500 of the projection 50 is formed of PA whose rigidity is high relatively. Therefore, upon being subjected to shocks, the crack "c" develops quickly in the fragile portion 8. Then, the projection 50 separates from and breaks at the root quickly. Thus, the fuel-tank fitting 1 shows a quick breaking ability.

Example No. 2

Figure 6:
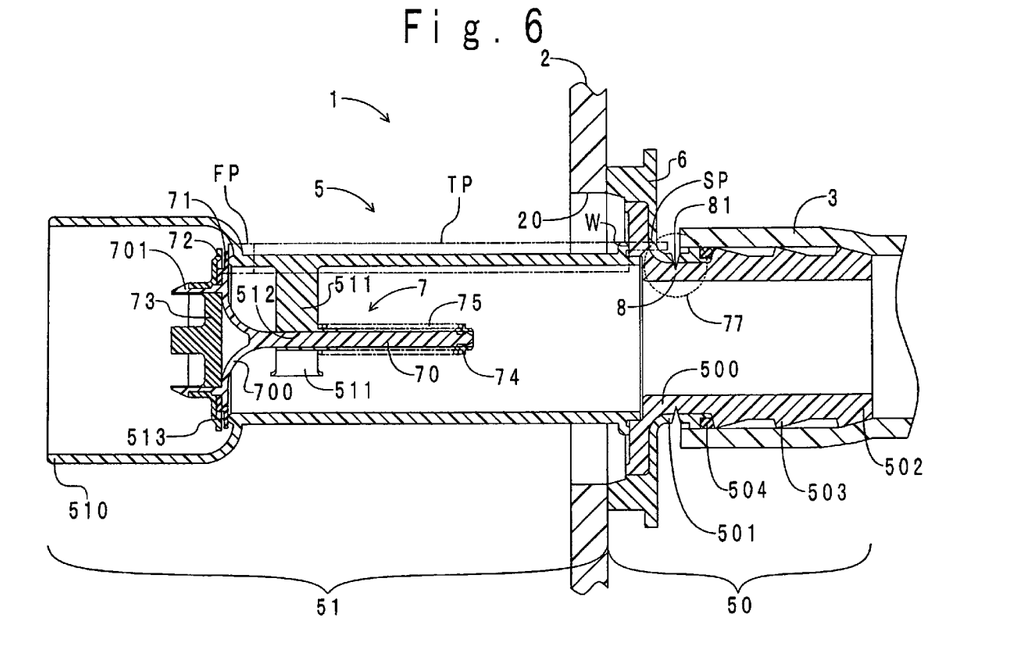
FIG. 6 is an axial cross-sectional view of a fuel-tank fitting according to Example No. 2 of the present invention.
Figure 7:
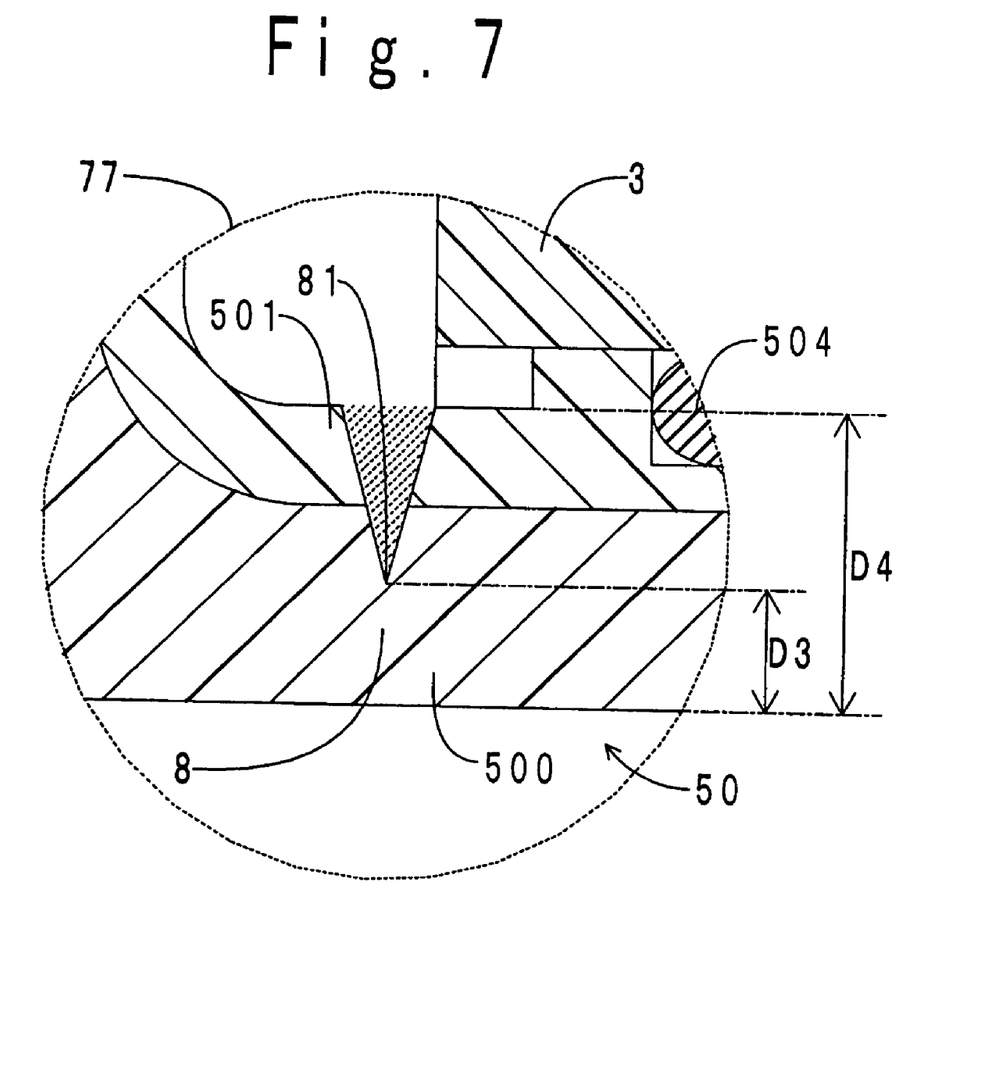
FIG. 7 is an enlarged diagram of a portion of the fuel-tank fitting according to Example No. 2 within the window 77 of FIG. 6, which is designated with a dotted line.

A fuel-tank fitting 1 according to Example No. 2 of the present invention differs from the fuel-tank fitting 1 according to Example No. 1 in that a groove formed in the outer periphery of the projection makes the fragile portion. Therefore, only the difference will be hereinafter described. FIG. 6 illustrates an axial cross-sectional view of the fuel-tank fitting 1 according to Example No. 2. FIG. 7 illustrates an enlarged diagram of a portion of the fuel-tank fitting 1 according to Example No. 2 within the window 77 of FIG. 6, which is designated with a dotted line. In FIGS. 6 and 7, note that parts like those of FIGS. 2 and 3 are designated at the same reference numerals.

As can be appreciated from the drawings, the fragile portion 8 of the fuel-tank 1 according to Example No. 2 is disposed closer to the filler pipe 3 than that of the fuel-tank 1 according to Example No. 1 is (see FIG. 2). The fragile portion 8 is formed by radially carving a groove (i.e., the hatched area of FIG. 7 designated with the dotted lines) having a V-shaped cross section in the outer surface the outer periphery 501 of the projection 50, which has been molded in advance, inward from the outside to the inside. Note that the thickness "D3" of a part at which the fragile portion 8 is disposed is thinner than the thickness of the other parts, for instance, the thickness "D4" as illustrated in FIG. 7.

When the filler pipe 3 is subjected to shocks, stresses concentrate at the groove bottom 81 of the fragile portion 8. Accordingly, a crack develops in the fragile portion 8. Then, the crack penetrates the projection 50 diametrically. Consequently, the projection 50 separates from the root, and breaks into parts on which the fragile portion 8 borders. Thus, the fuel-tank fitting 1 according to Example No. 2 effects advantages in the same manner as the fuel-tank fitting 1 according to Example No. 1.

Example No. 3

Figure 8:
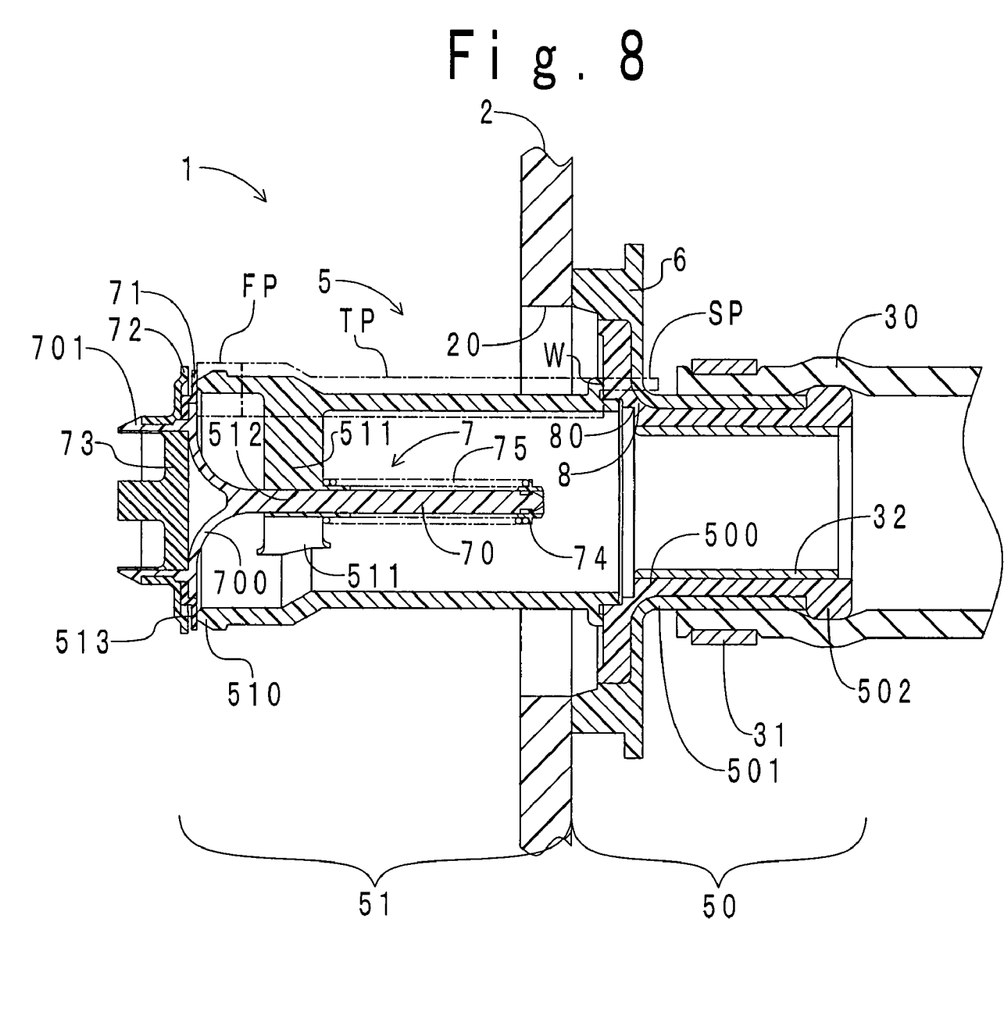
FIG. 8 is an axial cross-sectional view of a fuel-tank fitting according to Example No. 3 of the present invention.

A fuel-tank fitting 1 according to Example No. 3 of the present invention differs from the fuel-tank fitting 1 according to Example No. 1 in that the projection 50 is fitted into a rubber hose, not into the resinous filler pipe 3. Therefore, only the difference will be hereinafter described. FIG. 8 illustrates an axial cross-sectional view of the fuel-tank fitting 1 according to Example No. 3. In FIG. 8, note that parts like those of FIG. 2 are designated at the same reference numerals. As shown in the drawing, a metallic collar 32 is fitted into and engaged with the inner periphery 500. Moreover, the projection 50 is fitted into a rubber hose 30 by press-in fitting. The rubber hose 30 is connected with a filler pipe (not shown), which communicates with a filler opening, at the upstream end. A metallic clamp 31 fastens the rubber hose 30 to the projection 50. The fastening secures a fuel-sealing ability between the projection 50 and the rubber hose 30.

The fuel-tank fitting 1 according to Example No. 3 effects advantages in the same manner as the fuel-tank fitting 1 according to Example No. 1. Moreover, the fuel-tank fitting 1 according to Example No. 3 absorbs shock energies by the rubber hose 30's own elastic deformation. For example, when the rubber hose 30 is subjected to shocks, the rubber hose 30's own elastic deformation first absorbs the energy of shocks. Subsequently, the fracture of the fragile portion 8 absorbs the excessive energy, not absorbed by the rubber hose 30. That is, the double precautions, the elastic deformation of the rubber hose 30 and the fracture of the fragile portion 8, can absorb the energy of shocks completely. Accordingly, the rubber hose 30 and fragile portion 8 can absorb a relatively large quantity of energy. Consequently, it is less likely that the fuel-sealing ability of the fuel tank 9 is damaged by the excessive shock energy after the fracture of the fragile portion 8. In addition, when the energy of shocks are small relatively, the rubber hose 30 alone can absorb the shock energy completely before the fragile portion 8 fractures. Note that the projection 50 of the fuel-tank 1 according to Example No. 3 is shorter than that of the fuel-tank 1 according to Example Nos. 1 and 2. Hence, lesser stresses are applied to the root of the projection 50.

Example No. 4

Figure 9:
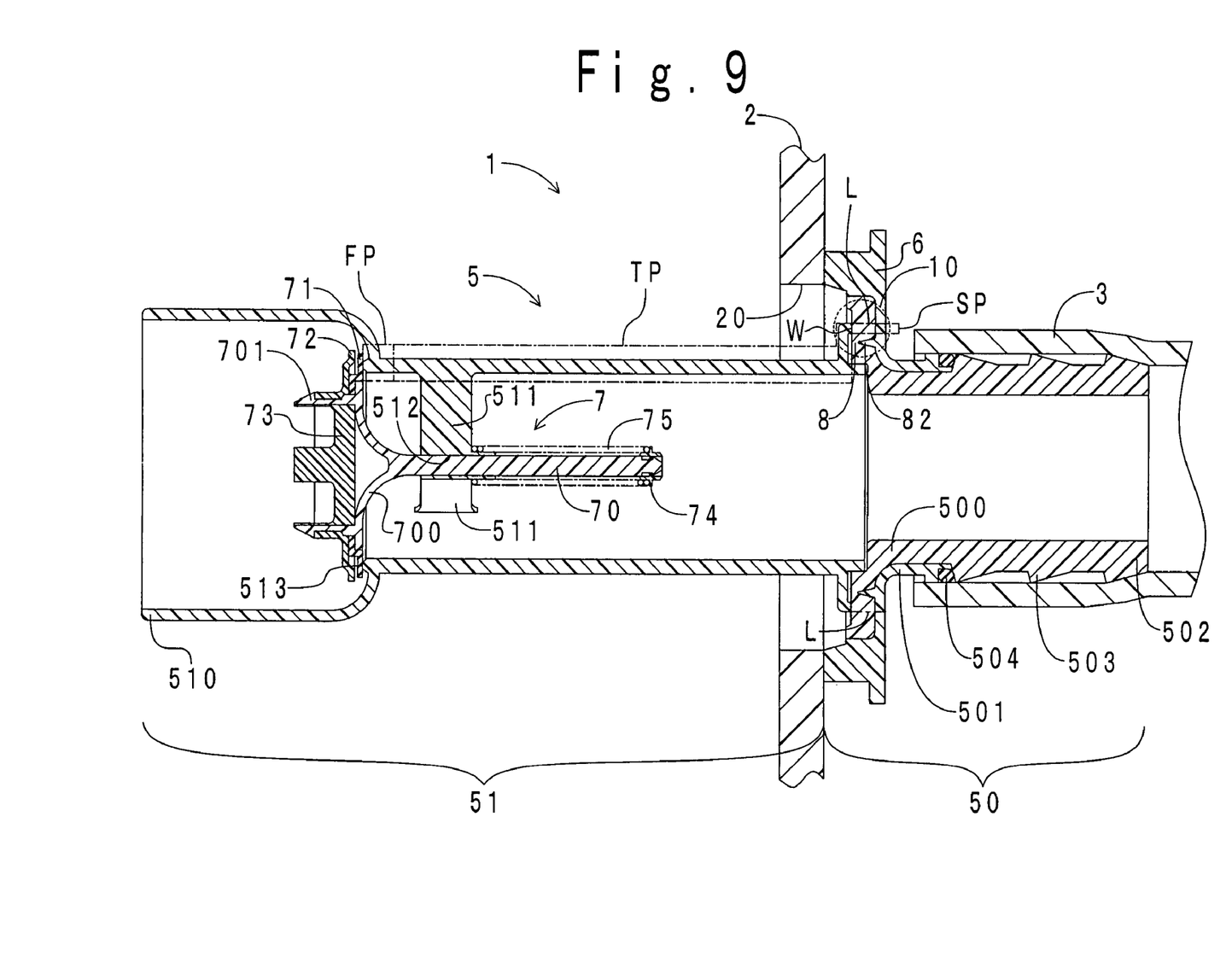
FIG. 9 is an axial cross-sectional view of a fuel-tank fitting according to Example No. 4 of the present invention.
Figure 10:
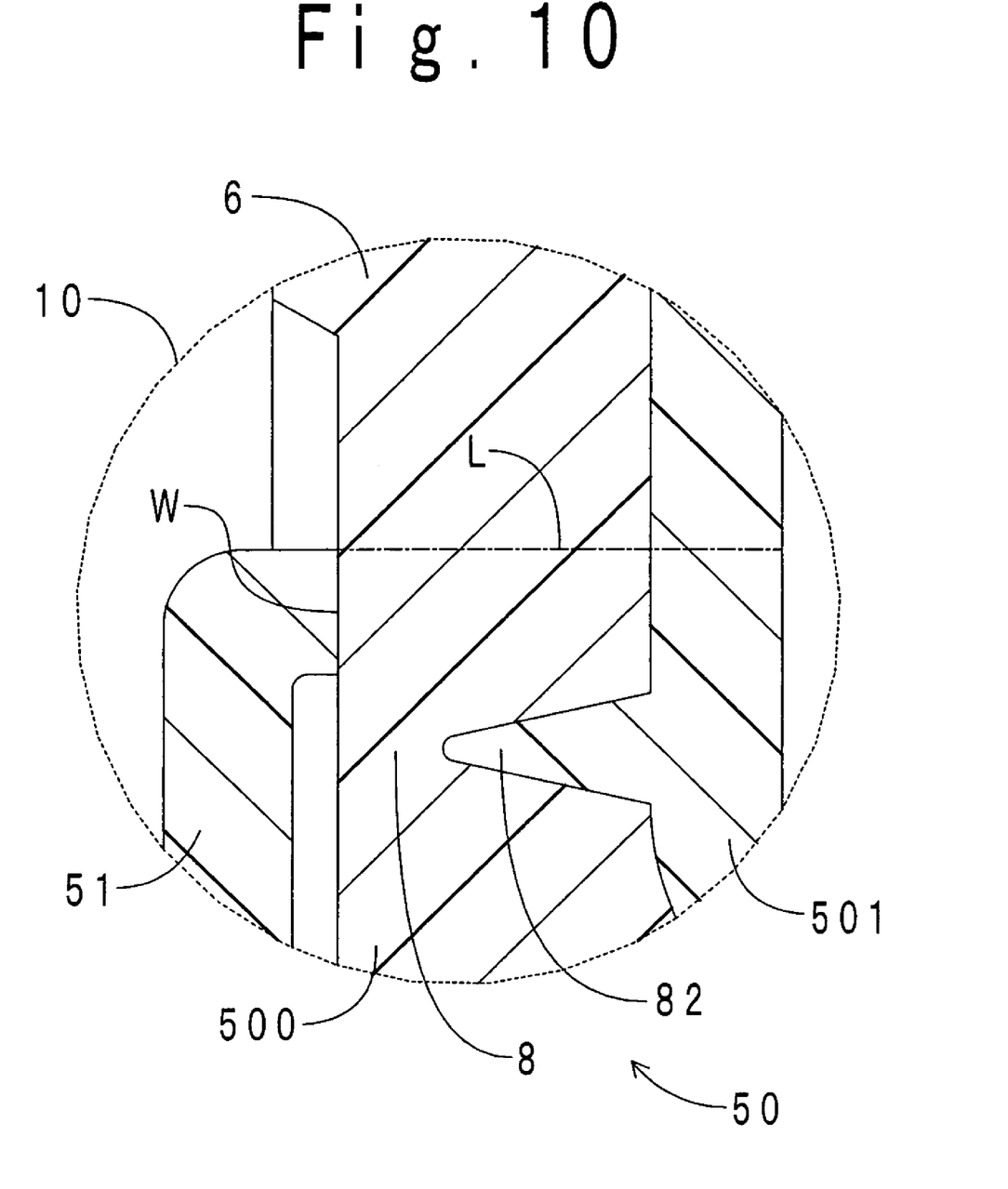
FIG. 10 is an enlarged diagram of a portion of the fuel-tank fitting according to Example No. 4 within the circle "10" of FIG. 9 designated with a dotted line.

A fuel-tank fitting 1 according to Example No. 4 of the present invention differs from the fuel-tank fitting 1 according to Example No. 1 in that a fragile portion is disposed on an inner peripheral side with respect to the weld between the inner periphery and the accommodation. Therefore, only the difference will be hereinafter described. FIG. 9 illustrates an axial cross-sectional view of the fuel-tank fitting 1 according to Example No. 4. FIG. 10 illustrates an enlarged diagram of a portion of the fuel-tank fitting 1 according to Example No. 4 within the circle "10" of FIG. 9 designated with a dotted line. In FIGS. 9 and 10, note that parts like those of FIGS. 2 and 3 are designated at the same reference numerals.

As shown in the drawing, a fragile portion 8 is disposed on an inner peripheral side with respect to the weld "W" between the inner periphery 500 and the accommodation 51. The fragile portion 8 is formed in the following manner. An annular boss 82 is disposed on the inner peripheral surface of the outer periphery 501 in the primary molding of the fitting body 5. Then, the inner periphery 500 is molded over the boss 82 secondarily. The boss 82 is formed as a wedge shape in the cross section. Note that the line "L" depicted with the chain line of the drawings corresponds to the present "outer peripheral surface of the fitting body."

When shocks are applied to the filler pipe 3, stresses concentrate at the leading end of the boss 82. Accordingly, cracks develop in the fragile portion 8 starting at the leading end of the boss 82. The cracks then penetrate the projection 50 axially. Consequently, the projection 50 separates and breaks into parts on which the fragile portion 8 borders. Thus, the fuel-tank fitting 1 according to Example No. 4 effects advantages in the same manner as the fuel-tank fitting 1 according to Example No. 1.

Example No. 5

Figure 11:
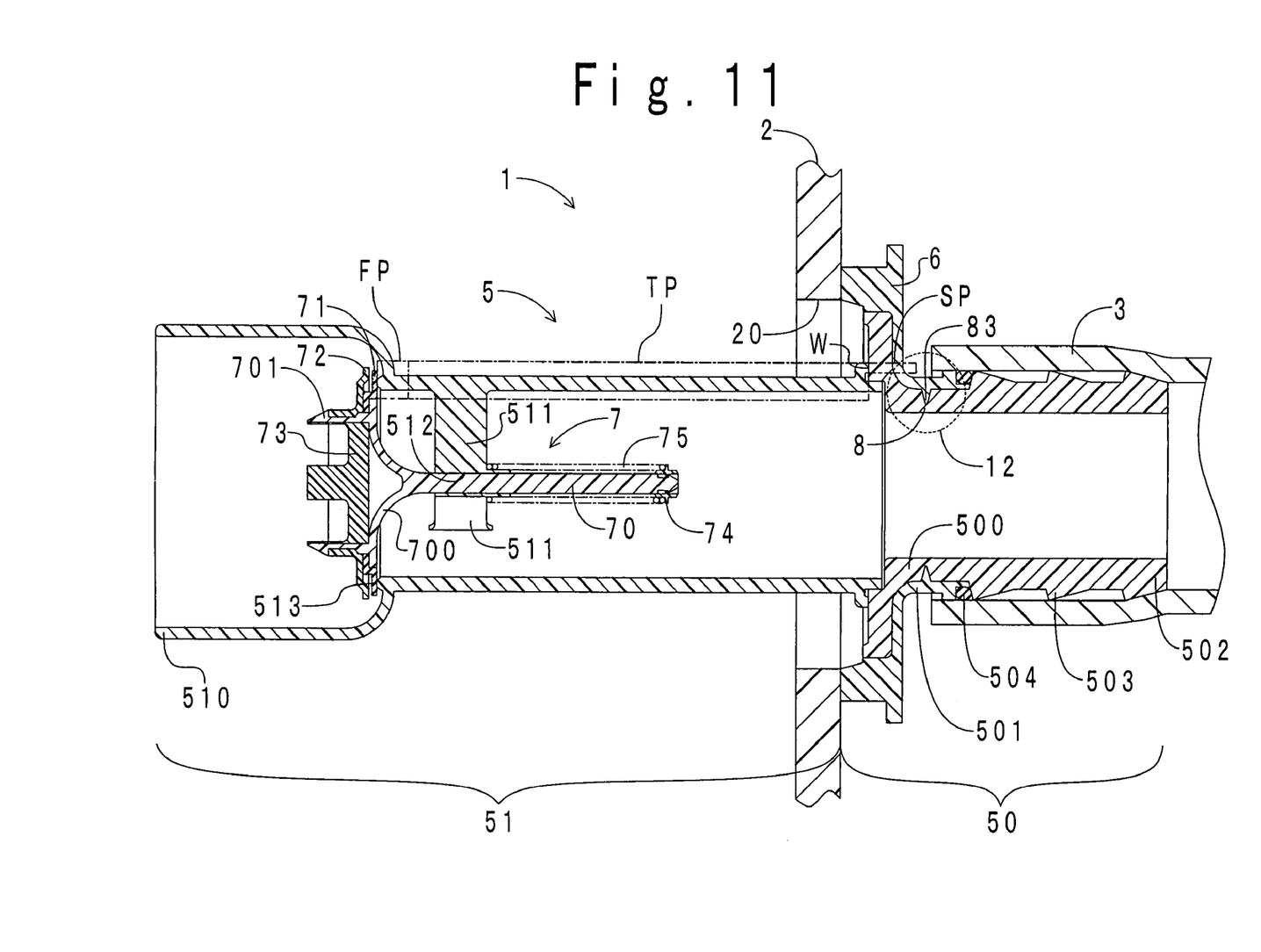
FIG. 11 is an axial cross-sectional view of a fuel-tank fitting according to Example No. 5 of the present invention.
Figure 12:
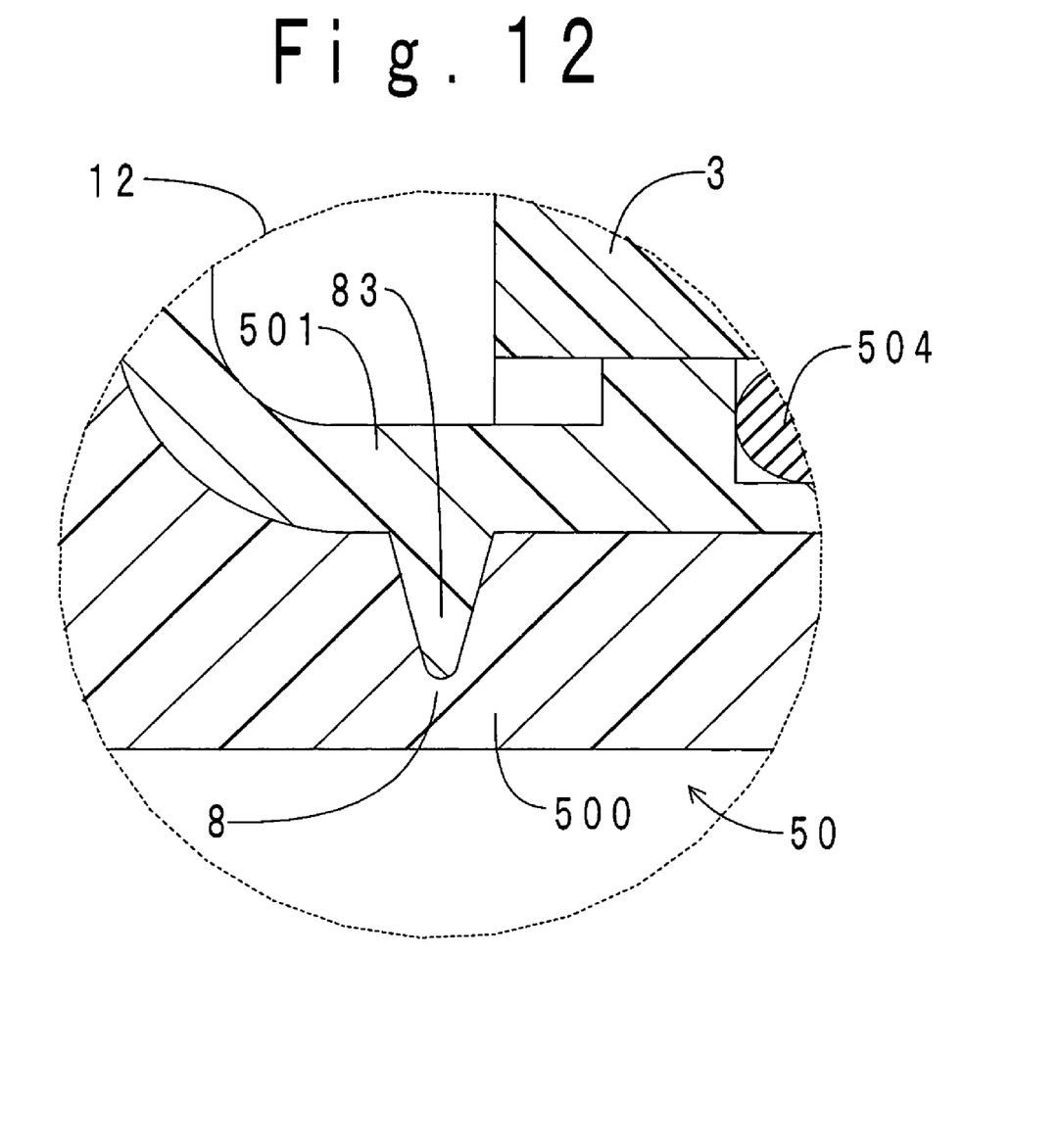
FIG. 12 is an enlarged diagram of a portion of the fuel-tank fitting according to Example No. 5 within the circle "12" of FIG. 11 designated with a dotted line.

A fuel-tank fitting 1 according to Example No. 5 of the present invention differs from the fuel-tank fitting 1 according to Example No. 2 in that a fragile portion is made by an annular boss formed in the outer periphery. Therefore, only the difference will be hereinafter described. FIG. 11 illustrates an axial cross-sectional view of the fuel-tank fitting 1 according to Example No. 6. FIG. 12 illustrates an enlarged diagram of a portion of the fuel-tank fitting 1 according to Example No. 5 within the circle "12" of FIG. 11 designated with a dotted line. In FIGS. 11 and 12, note that parts like those of FIGS. 6 and 7 are designated at the same reference numerals.

A fragile portion 8 is formed in the following manner. An annular boss 83 is disposed on the inner peripheral surface of the outer periphery 501 in the primary molding of the fitting body 5. Then, the inner periphery 500 is molded over the boss 83 secondarily. The boss 83 is formed as a wedge shape in the cross section. When shocks are applied to the filler pipe 3, stresses concentrate at the leading end of the boss 83. Accordingly, cracks develop in the fragile portion 8 starting at the leading end of the boss 83. The cracks then penetrate the projection 50 radially. Consequently, the projection 50 separates and breaks into parts on which the fragile portion 8 borders. Thus, the fuel-tank fitting 1 according to Example No. 5 effects advantages in the same manner as the fuel-tank fitting 1 according to Example No. 1.

Moreover, as described above, the fitting body 5 is molded in the order of first the outer periphery 501 and then the inner periphery 500. When the boss 83 is formed in the outer periphery 501 prior to molding the inner periphery 500, a constriction (i.e., the fragile portion 8) is formed in the molding of the inner periphery 500. The thus formed constriction makes weld marks less likely to occur in the annular ribs 503. As a result, the fuel-sealing ability is enhanced between the fuel-tank fitting 1 and the filler pipe 3.

MODIFIED VERSIONS

Heretofore, a few of the embodiment modes of the present fuel-tank fitting are described. However, the embodiment modes are not limited to the above-described embodiment modes particularly. It is possible to perform the present fuel-tank fitting in various modified embodiment modes or improved embodiment modes which one of ordinary skill in the art can carry out.

For example, the fragile portion 8 cannot necessarily break completely. That is, the fragile portion 8 can absorb shock energies to such an extent that the crack development in the fragile portion 8 enables the fuel tank 2 to keep the fuel-sealing ability. Moreover, in the above-described examples, the thickness difference between the parts of the fitting body 5 makes the fragile portion 8. However, the rigidity difference between the parts of the fitting body 5 can make the fragile portion 8. For instance, it is possible to make the fragile portion 8 by burying a block, which forms a part of the fitting body 5 and is made of a resin of lower rigidity than that of another resin forming the other parts of the fitting body 5, in the fitting body 5. In addition, in the examples, the check valve 7 is disposed in the accommodation 51 of the fitting body 5. However, in fuel-tank fittings free from the accommodation 51, the check valve 7 can be disposed in the projection 50 of the fitting body 5.

Having now fully described the present invention, it will be apparent to one of ordinary skill in the art that many changes and modifications can be made thereto without departing from the spirit or scope of the present invention as set forth herein including the appended claims.

What is claimed is:

1. A fitting for fuel tanks, comprising:
   a cylinder-shaped fitting body comprising a connecting end to be connected with a pipe, and a free end to be disposed freely inside a fuel tank;
   a flange disposed on an outer peripheral surface of the fitting body, and fastened to an opening periphery of an installation opening opened through the fuel tank; and
   a check valve disposed in the fitting body, being openable only in a direction heading from the connecting end of the fitting body to the free end thereof, and being closable for sealing a fuel, wherein
   the fitting body further comprises a fragile portion, which is joined to the flange and is shaped to have lower resistance to fracture than other portions of the fitting body in response to shock applied to the fitting body,
   the fitting body, the flange and the check valve are constructed and arranged to maintain a seal to prevent fuel from leaking from the fuel tank through the installation opening if the fragile portion fractures;
   at least part of the fitting body includes an outer layer and an inner layer, wherein the material of the outer layer is different from the material of the inner layer; and
   the fragile portion includes a thinned portion, which includes a groove that extends through the outer layer and into the inner layer.

2. The fitting set forth in claim 1, wherein:
   the fitting body further comprises a projection protruding to the outside of the fuel tank and being provided with the connecting end; and
   the fragile portion is located at a proximal portion of the projection.

3. The fitting set forth in claim 1, wherein the connecting end of the fitting body is fitted into a rubber hose.

4. The fitting set forth in claim 1, wherein the fragile portion is located closer to a central axis of the fitting body than a fastening portion, at which the flange is fastened to the fitting body.

* * * * *